United States Patent [19]
De Bussy

[11] 3,812,226
[45] May 21, 1974

[54] METHOD FOR PRODUCING OBJECTS FROM A MOLTEN CERAMIC PRODUCT

[76] Inventor: Jacques Marie Yves Le Clerc De Bussy, Bussy, 80 Piox, France

[22] Filed: Mar. 30, 1972

[21] Appl. No.: 239,612

Related U.S. Application Data

[63] Continuation-in-part of Ser. No. 38,697, May 19, 1970, abandoned.

[52] U.S. Cl.............. 264/6, 117/105.3, 264/8, 264/9, 264/212, 264/332
[51] Int. Cl............................................. B22c 23/08
[58] Field of Search.... 65/18, 66; 117/46 FS, 105.3; 264/62, 212, 332, 6, 9, 13, 8; 118/DIG. 4, 324; 164/46

[56] References Cited
UNITED STATES PATENTS

| | | |
|---|---|---|
| 2,733,172 | 1/1956 | Brennan........................ 117/105.3 X |
| 3,399,253 | 8/1968 | Eschenbach et al............ 264/62 UX |
| 3,486,870 | 12/1969 | Vervaart et al................. 264/332 X |
| 3,533,905 | 10/1970 | O'Meara........................... 65/18 X |
| 3,245,380 | 4/1966 | Carroll............................. 118/324 |
| 3,278,284 | 10/1966 | Van Dolah et al........... 264/332 UX |

Primary Examiner—Robert F. White
Assistant Examiner—Gene Auville

[57] ABSTRACT

Method and device for producing objects from a continuous stream of molten ceramic product in which a shower of particles of the product is produced by allowing the stream of product to fall onto a cooled surface wherefrom a shower of particles produced is directed onto the object in course of formation. The heat of the particles causes them to weld to the already-formed part of the object.

9 Claims, 8 Drawing Figures

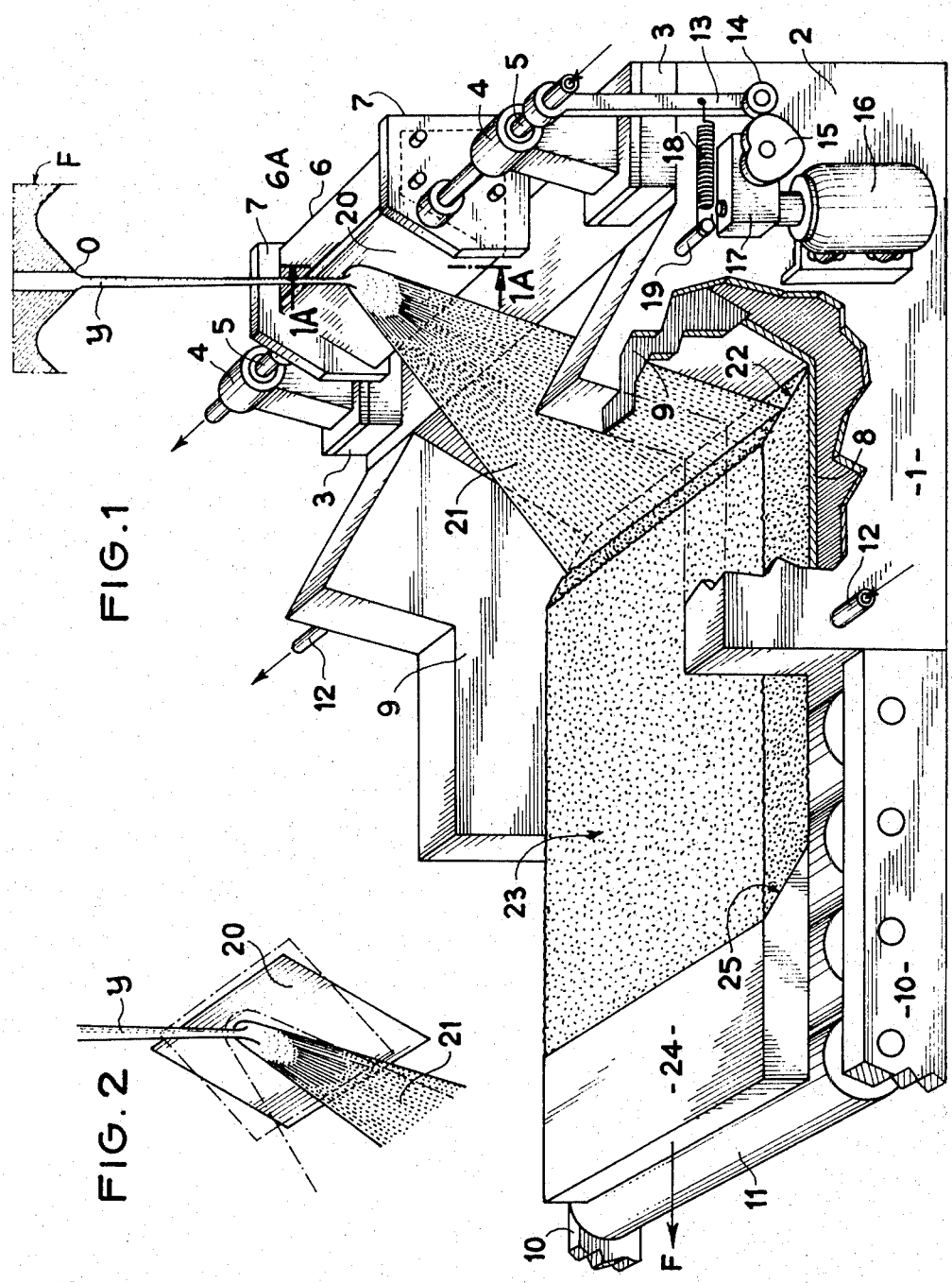

PATENTED MAY 21 1974 3,812,226
SHEET 2 OF 3
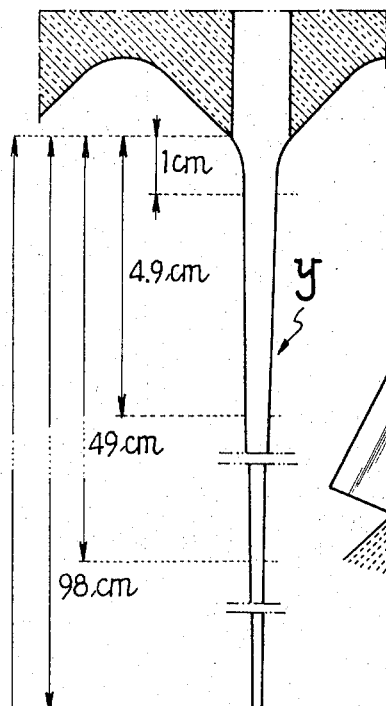
FIG_4
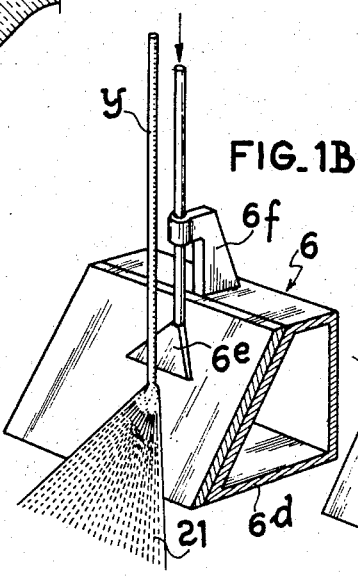
FIG_1B
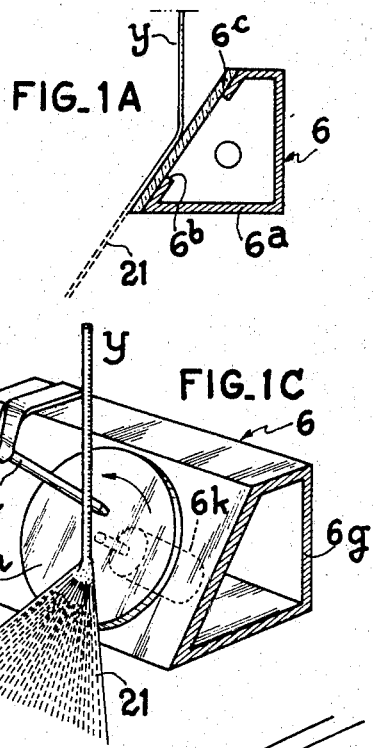
FIG_1A
FIG_1C
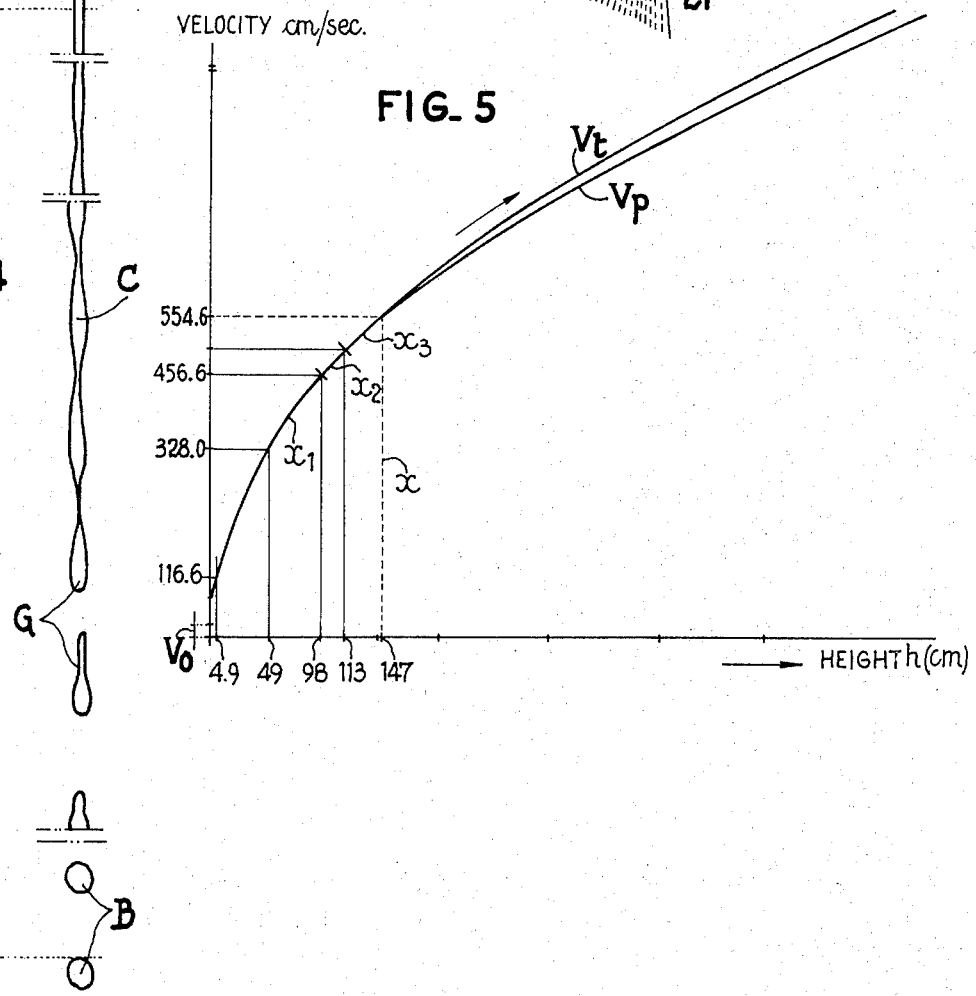
FIG_5

METHOD FOR PRODUCING OBJECTS FROM A MOLTEN CERAMIC PRODUCT

This is a continuation-in-part of my application Ser. No. 38,697, filed on May 19, 1970 now abandoned.

The present invention relates to a method and a device for producing objects of ceramic material from a continuous stream or jet of a molten ceramic product.

Heretofore, objects of ceramic material produced from a continuous stream of molten ceramic product are mainly produced in moulds which are rapidly filled with a molten material in the liquid state. Thereafter a cooling process solidifies the object. However, as the solidification starts on the surface of the object and gradually reaches the centre and, moreover, as shrinkage occurs in the course of the solidification, bubbles or flaws are formed in the centre of the object which very adversely affect the quality of the product. To avoid this drawback, various artifices are known in the moulding field, for example the use of risers which localize the shrinkage. In respect of ceramic objects these risers are relatively large so that a large part of the initial material is lost. Moreover, the conventional moulding method is intermittent and does not allow a continuous production of the object.

Further, according to U.S. Pat. Nos. 3,339,253 and 3,486,870, methods are known for forming ceramic objects which comprise forming the objects by successive layers of a finely-divided molten supply material. Each newly-formed layer is integrated with the subjacent layer owing to the thermic energy contained in the particles of the supply material at the moment of impact.

The finely-divided supply material is formed from a ceramic powder which is heated in the very hot stream of the gases of combustion of a burner which provides the powder not only with the thermic energy but also the kinetic energy for conveying the particles to the layer being formed.

A first drawback of these methods resides in the very poor thermic efficiency, since the burner transmits only a very small amount of its thermic energy to the powder, the remainder of this energy being completely lost in the surrounding atmosphere.

A second drawback of these methods resides in the fact that they do not permit obtaining objects of large size.

Indeed, the section of the gas stream which carries along the powder particles cannot exceed a reasonable limit, in particular owing to the very high temperature that must be imparted to the ceramic particles.

Further, the amount of particles carried along per unit time is comparatively small in the gas stream of the burner so that the supply of material per unit time to the object being formed can only be very small.

If a higher forming rate is desired, the velocity of the gas stream would have to be increased and this would result in a still lower thermic efficiency. Further, a high velocity of these gases would affect the quality of the coating in that the gases would be capable of creating swirls and disturbances near the surface of the coating which would have an adverse effect on the homogeneity of the coating.

The methods disclosed in the aforementioned U.S. patents therefore cannot result in an economical formation of large ceramic objects, such as blocks of any kind, refractory bricks, tubes. On the contrary, their utility is limited to the forming of small objects or thin protective layers on objects to be cladded.

According to the invention, a ceramic object is formed by spraying a dense spray or sheet of particles of a previously melted material at low velocity onto a solid receiving surface. The latter is first constituted by a starting surface which moves in translation and then by an edge portion of the object in the course of the formation of the object, the particles of the sheet being at such temperature that they are integrated into said edge portion of the object moving in translation.

In contradistinction to the methods disclosed in the aforementioned U.S. patents, the sheet of particles is formed from a continuous stream of molten liquid ceramic product which is made to fall vertically onto a spray-forming or pulverizing surface. This surface has a low coefficient of friction so that there is no loss of kinetic energy by friction of the product upon contact with the surface.

In order to ensure that the sprayed or pulverized particles are integrated in a satisfactory manner into the layer being formed, the temperature of the particles of this stream is 5 to 10 percent higher than the melting temperature of the ceramic product.

Owing to the fact that the spray or sheet of particles is produced from a liquid jet or stream of molten ceramic product, the amount of material supplied per unit time is much higher than that of a stream of particles carried along by gases and it is possible to achieve high forming rates which render the method according to the invention applicable to the manufacture of objects of large size.

Indeed, a stream of ceramic material produced, for example, by means of a melting furnace of the type disclosed in U.S. Pat. No. 3,580,976, permits an output of 5 metric tons/day and more. This rate is difficuult to achieve under economical conditions by conventional processes for forming an object from a stream of powder formed by means of a flame.

These methods at the present time appear limited to the spraying of about 30 kilograms/day of ceramic material.

Further features and advantages of the invention will be apparent from the ensuing description with reference to the accompanying drawings.

In the drawings:

FIG. 1 is a diagrammatic perspective view, with parts cut away, of a device for carrying out the method according to the invention, said device being adapted to produce rectangular-sided slabs of ceramic material;

FIGS. 1A–1C show on an enlarged scale partial views of three modifications of the invention;

FIG. 2 is a diagrammatic view showing a spraying process;

FIG. 4 is an elevational view of a stream or jet of molten ceramic material issuing from the pouring orifice of a melting furnace, the view showing the reduction in diameter of the stream as a function of its height of fall and its transformation into drops, and FIG. 5 is a diagram showing the increase in the velocity of the jet as a function of the height of fall.

Figure 3:
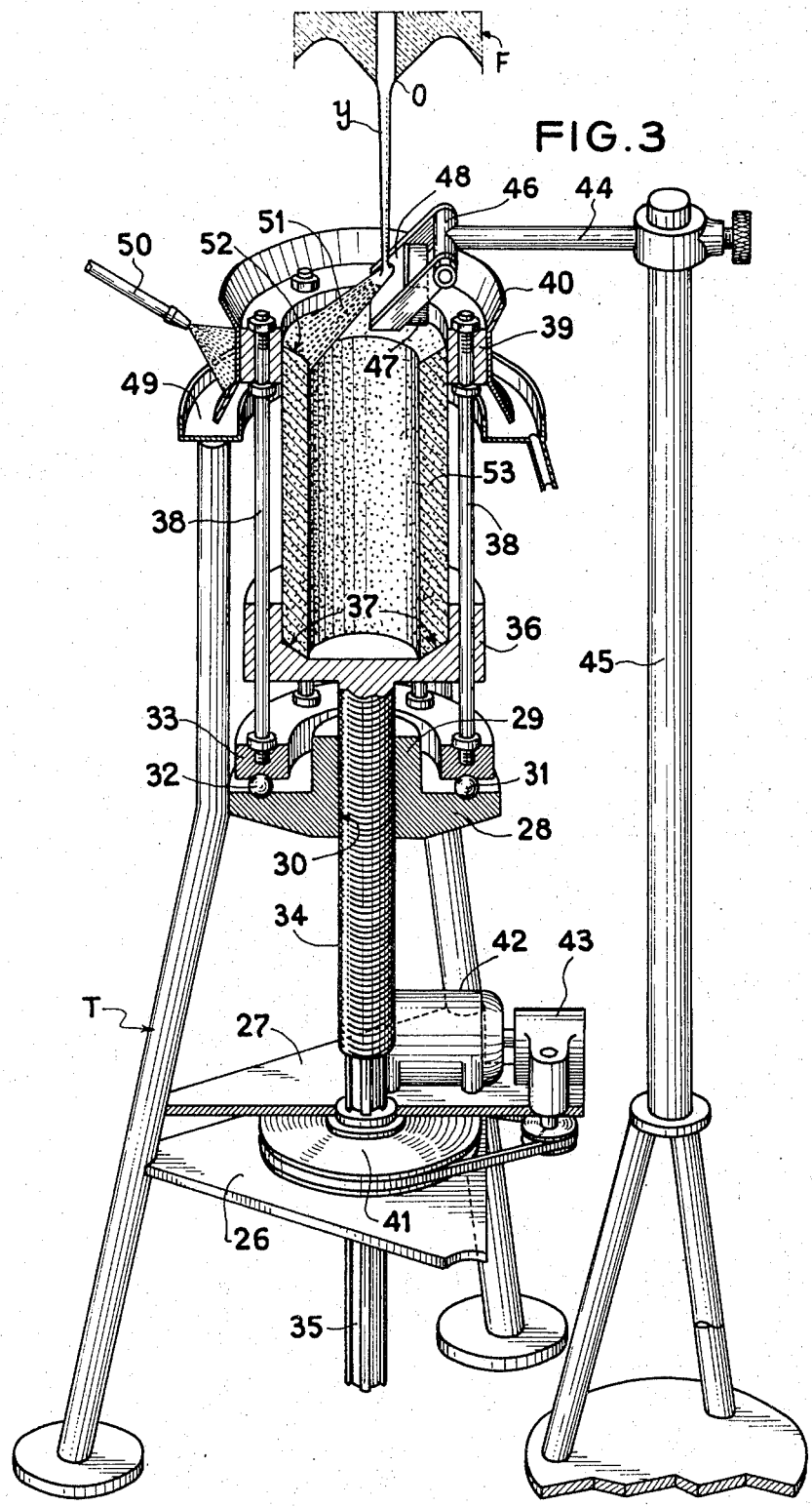
FIG. 3 is a modification of the device for carrying out the method according to the invention, the object to be produced being in the form of a tube of ceramic material.

The device for carrying out the method according to the invention shown in FIG. 1 comprises a cradle 1 which is open at the front end and has at the rear (on the right as viewed in FIG. 1) a hollow end wall 2 on the upper face of which are mounted two brackets or blocks 3. Each of the latter carries a bearing 4 in which is journalled a half-shaft 5. A block 6 is clamped between two side members 7 which are integral with the half-shafts 5 respectively.

The cradle 1 has a bottom wall 8 and two hollow lateral walls 9 each of which has an extension portion 10. Operatively interconnected rollers 11 are mounted between the extension portions 10, at least one of the rollers being driven by drive means (not shown) such as an electric motor.

The block 6 and the half-shafts 5 are hollow so that the assembly can be connected to a cooling circuit containing, for example, cooling water whereby the block 6 can be maintained at an appropriate temperature.

For the same purpose, the lateral walls 9 are connected to a cooling circuit 12.

One of the half-shafts 5 is integral with a lever 13 whose free end carries a roller 14. The latter bears on a heart-shaped cam 15 which is driven in rotation by an electric motor 16 through a speed-reducer 17.

A return spring 18 is hooked between the lever 13 and a pin 19 fixed to the cradle 1.

The device described heretofore is placed below the outlet of a melting furnace F whose lower part, and in particular the pouring orifice O, is shown diagrammatically in FIG. 1.

The axis of this orifice 0 is placed directly above the block 6 so that a stream or jet y of the molten product issuing from the furnace F can fall vertically onto the block.

A particularly suitable melting furnace for producing the stream y is that disclosed in U.S. Pat. No. 3,580,976. It is possible to melt therein, for carrying out the present invention, ceramic products such as alumina, Mullite or a composition of 17 percent of $SiO_2$, 51 percent of $Al2O_3$ and 32 percent of $ZiO_2$.

Many observations of the handling of molten ceramic products have revealed to the Applicant that most of them have a very low viscosity in the molten state and that the products in this state can be converted into a projection or shower of small particles from a liquid jet or stream of this product.

FIG. 4 shows on an enlarged scale the pouring orifice O and the stream y of molten ceramic product.

This stream has a maximum diameter as it issues from the orifice and gradually decreases as a function of the height of fall. At a distance d (FIG. 4) from the orifice, the stream changes into a "chain" C in which can be seen periodic variations of diameter preceding the separation of the stream into drops G which thereafter become balls B.

When the stream y issues from the orifice 0 it has an initial velocity $V_0$. The latter is a function in particular of the diameter of the pouring orifice 0, the rate of flow and the density of the molten product. It will be seen hereinafter that this initial velocity is practically negligible compared to the velocity assumed by the stream in the course of its free fall as concerns heights of fall for which the invention can be put into practice.

As soon as the stream issues from the pouring orifice, it is only subjected to the laws of gravity. Indeed, the viscosity of the products employed at very high temperature and the resistance of the air to the stream are practically negligible.

The stream thus follows the law of gravity in the following manner:

$$V = V_o + g \sqrt{2h/g}$$

in which $V$ = velocity of the stream at any height;
$g$ = intensity of the effect of gravity;
$h$ = height of fall.

If the initial velocity is neglected, it is observed that the velocity of the stream only depends on the height $h$.

In the course of its free fall, the stream gathers momentum which is exploited in accordance with the invention for achieving the pulverization or spraying of the ceramic product. It will be observed that in the course of its fall, the only supply of energy is that of gravity.

FIG. 1 shows that the stream y is received by the spray-forming or pulverizing surface 20 of the block 6. This surface is so designed as to preclude any loss of energy by friction upon its contact. In other words, owing to the fact that the stream strikes this surface and the product slides along the latter, kinetic energy accumulated in the stream is not absorbed in the region of the spray-forming surface but is, on the contrary, employed in major part for producing the spray. This spray is produced moreover only when certain limits of stream velocity or height of fall are respected.

Indeed, it will be understood that if this height is excessively small (surface of the block 6 too near to the pouring orifice 0), the momentum gathered by the stream would be insufficient to produce the spray.

On the other hand, if the height of fall is excessive, a spray might be produced, but in this case the axial stability of the stream becomes more delicate to achieve and may be greatly affected by draughts of air for example.

The applicant has observed that the best height of fall for a ceramic product is 50–200 centimetres.

EXAMPLE

The following example illustrates the choice of the contemplated heights.

A ceramic product known under the trade name "ZAC" containing 15 percent of $SiO_2$, 51 percent of $Al2O_3$ and 32 percent of $ZiO_2$ was melted in a furnace of the type disclosed in U.S. Pat. No. 3,580,976 and brought to the temperature of 1,900° C at the pouring orifice. Its density is 3.8 in the molten state.

The furnace supplied 2 kilograms of product per hour and had a pouring orifice diameter of 10mm. The rate of flow in litres is therefore:

$$200/3.8 = 52.6 \text{ litres/hour.}$$

The volume of molten product supplied per hour being:

52,600/3,600 = 14.61 sqcm/second, the initial velocity of the product may be calculated as follows:

$V_o$ = volume/second/Area of the orifice = 14.61/0.785 = 18.6 cm/second.

As the intensity of gravity is 980 centimetre/second$^2$, the velocities of the stream may be determined as a function of the height by means of the following formula:

$$V = V_o + g \sqrt{2h/g}$$

Further, the diameter of the stream corresponds to the formula:

$$\pi D^2 h/4 = \text{volume/second}$$

The following table gives the various values thus obtained:

| Height of fall (cm) | Velocity (cm/second) | Diameter of the stream (mm) |
|---|---|---|
| 1.0 | 62.4 | 5.45 |
| 4.9 | 116.6 | 3.98 |
| 49.0 | 328.0 | 2.36 |
| 98.0 | 456.6 | 2.00 |
| 147.0 | 554.6 | drops |

A diagram which illustrates this table is shown in FIG. 5 in which the velocity of the stream has been plotted as a function of the height of fall:

Note that FIG. 5 shows two curves $V_t$ and $V_p$ which respectively correspond to the theoretical velocity and the actual velocity of the molten product, bearing in mind the resistance in air.

Further, it can be seen that the two curves coincide in respect of the magnitudes of velocity within the rectangle $x$ shown in dotted line.

It should also be observed that the initial velocity $V_o$ of the stream has only a very slight effect on the velocity of the stream falling freely. At 1 cm from the orifice, this velocity is already 62.4 cm/second whereas the initial velocity was only 18.6 cm/second.

As can be seen in FIG. 4, at 98 cm from the orifice 0 the continuous stream first changes into a short "chain" C over length of about 15 cm and then turns into drops B. Up to a height of fall of about 150 cm, these molten drops B are still able to produce pulverization or spraying. The rectangle $x$ in FIG. 5 therefore represents the portion of the curve which is of utility in the invention, the part $x_1$ corresponding to an uninterrupted stream, the part $x_2$ to the "chain" C, and the part $x_3$ to the drops B.

The curve $V_p$ thereafter approaches an asymptotic value which determines the maximum value at which the drops can fall, bearing in mind the increasing effect of the resistance in air. However, this part of the curve is of no practical interest, as explained hereinbefore.

When the stream $y$ strikes the pulverizing or spray-forming surface 20 of the block 6 with a kinetic energy stored in its fall from the pouring orifice 0, there is first formed a very thin sheet or web before the ceramic product, owing to its surface tension, is formed into fine droplets of 1–3 mm in diameter (see FIG. 2 in particular).

Thus it is possible to create a plane circular projection if the surface 20 in question is perpendicular to the axis of the stream. However, for practical reasons, this position perpendicular to the surface is not very appropriate in certain cases. It is easier to dispose the surface obliquely relative to the axis of the stream so as to create a group or shower of particles in the form of a very thin sheet which is easily orientable by modifying the inclination of the surface relative to the axis of the stream (FIG. 1).

The fanning out of this sheet of particles is the greater as the inclination of the surface 20 is small relative to the horizontal. However, Applicant has discovered than an angle of 120°–130° to the vertical (axis of the stream) gives the best results.

The surface 20 is pivoted by the heart-shaped cam 15 which continuously pivots the lever 13, the half-shafts 5 and the block 6 so as to modify the inclination of the sheet of droplets 21. Thus, the lower edge of the sheet of droplets 21 pivots continuously and constantly sweeps across a receiving surface 22 formed on an edge portion of the slab or block 23 constituting the object in process of being produced. For example, the block 6 can effect between 40 and 60 pivotal movements per minute. Each droplet of the sheet 21 reaches the receiving surface 22 at such temperature that it has an excess amount of heat just sufficient to re-melt the material located under its point of impact on the receiving surface so that the droplet is welded to the material of the object in course of production.

If the amount of excess heat of the droplet is too high, there is a risk that the mass of the object in course of production will possess bubbles or flaws and even collapse or sink in the vicinity of the receiving surface 22. On the other hand, if the amount of excess heat is too small, there is a risk that the droplet will not become incorporated into the mass of the object. In either case, the product obtained would have irregularities which adversely affect its homogeneity, which can be avoided by carefully selecting the temperature of the droplets by regulating at the furnace F the temperature of the stream $y$.

Therefore, in order to ensure that the droplets become incorporated into the mass of the object, the stream must be given a temperature which is sufficient to compensate the losses of thermic energy which occur in the course of formation of the sheet of droplets 21. This temperature is for some products, such as alumina, around 2,300° C, the material loosing 200° C in the course of the formation of the sheet, in particular by the effect of radiation, and having a temperature of 2,100° C at the receiving surface, whereas the temperature of solidification of the material is for example 2,000° C.

Note that the impact of the droplets on the receiving surface 22 should be at relatively low velocity so that there is no mixing or stirring of the liquid surface layer constituting the receiving surface, since this disturbance of the liquid layer would result in gaseous inclusions in the object in course or production. As will be understood hereinafter, this velocity is of the same order of magnitude as the velocity of the stream at the moment of its impact on the spray-producing surface owing to the fact that the product loses practically no kinetic energy upon production of the spray.

The size of the droplets forming the sheet 21 is preferably of the order of 1–3 mm in diameter. This dimension is achieved automatically for a drop of the stream $y$ of 50–200 cm.

In order to start the object-forming process with the device shown in FIG. 1, a starting mass 24 which has an oblique leading surface 25 is placed in the vicinity of the wall 2 of the cradle. The sheet of droplets 21 is then directed onto the oblique surface 25 which is subsequently replaced by the filling surface 22 of the object 23 in process of being produced. The starting mass is continuously moved in the direction of arrow F and consequently exerts a traction on the block 23. In this way, it is possible to produce continuously a slab of ceramic which, after production, can directly enter an annealing furnace.

The walls of the cradle 1 are preferably of a suitable water-cooled metal.

As already mentioned, the molten product of the stream y must have a very small coefficient of friction with respect to the spray-forming surface. Sliding must be produced without, or practically without, energy loss.

This low coefficient of friction is achieved preferably by the creation of a gaseous film on the surface 20. FIGS 1 and 1B show a first embodiment of the block 6.

The block 6 comprises a hollow carcass or shell $6^a$ of folded sheet metal, for example, having a trapezium shape. The inclined side of this shell has a rectangular opening $6^b$ in front of which is fixed a plate $6^c$ of porous material which resists the very high temperature of the stream y. This plate is preferably composed of porous graphite.

The block 6 thus constructed and clamped in a fluid-tight manner between the side members or walls 7, has a cooling fluid under pressure flowing therethrough. A small amount of this fluid, which is preferably water, passes through the graphite plate and issues from the surface of the plate above, in particular the point of impact of the stream y. The calefaction of this water results in the formation of a stream "cushion" which practically eliminates any friction.

In FIG. 1B, the block 6 comprises a shell $6^d$ of sheet metal which is closed and has a cooling liquid flowing therethrough. The section of the shell also has a trapezium shape, its inclined wall also receiving a graphite plate on which the water, or other suitable liquid, may be projected by means of a nozzle $6^e$ fixed to the shell $6^d$ by means of a support $6^f$. The water issuing from the nozzle $6^e$ in a direction parallel to the spray-forming surface 20 is vaporized in the region of the stream of molten product and forms a gaseous "cushion."

FIG. 1C shows another embodiment in which the block 6 is constituted by a closed shell $6^g$ in which cooling liquid has no need to flow. In this case, the stream y falls onto a rotary disc $6^h$, preferably of graphite which is driven by an electric motor $6^k$, for example placed in the block 6. The axis of the disc $6^h$ is contained in a plane containing the axis of the stream y. A spraying tube $6^l$ is provided for continuously lubricating the disc $6^h$, the stream sprayed by this tube being directed counter to the direction of rotation of the disc, as shown.

The lubricating liquid can here be water, beeswax heated to 70° C, or another oily lubricant which does not create waste or ash subsequent to its partial combustion upon contact with the product to be sprayed.

It is also possible to provide a rotating disc with no spraying tube. In this case, the disc is coated with a solid material which is directly sublimated upon contact with the stream of ceramic product at high temperature.

Tetrafluoroethylene (trade mark TEFLON) is particularly appropriate for this purpose. It will be understood that it would then be necessary to replace the disc regularly, since the material wears in the course of the method according to the invention.

The disc may rotate at a speed of 3,000 rpm for example.

FIG. 3 shows another embodiment according to the invention in which sections of cylindrical tubes are produced continuously.

The illustrated device comprises a tripod T shown partially. Two guide plates 26 and 27 are integral with the tripod.

A support plate 28 is mounted between the legs of the tripod and comprises, integral therewith, a sleeve 29 and a screwthreaded axial bore extending through the sleeve and plate. An annular groove 31 is formed in the top face of the plate 28 and receives balls of a ball bearing 32. A ring 33 bears on the balls.

A screwthreaded rod 34 extends through the bore 30 and is downwardly extended by a splined portion 35. The rod 34 is in one piece with a cup 36 which has on the periphery of its bottom a frustoconical annular face 37.

Vertical bars 38 are screwthreadedly engaged in the ring 33 and carry at their upper ends a collar 39 encompassing an annular reflector 40.

The rod 34 is slidable in the guide plates 26 and 27 and a disc 41 drives it in rotation. The disc 41 is driven by an electric motor 42 through a speed reducer 43.

A horizontal arm 44 is mounted on a support 45 located to one side of the tripod T. The arm 44 carries at its free end a fork 46 whose branches grip a block 47 which is preferably of graphite and has an inclined face 48.

A trough 49 is located under the lower edge of the reflector 40 for receiving the cooling liquid which is sprayed against its surface by a spray head 50 for the purpose of maintaining the collar 39 at a suitable temperature.

The block 47 is adjustable in height so as to enable the inclination of the surface 48 to be adjusted.

A stream or jet y of ceramic material falls vertically onto the surface 48 so as to form a sheet of particles 51.

When the device starts up, the cup 36 is in its upper position so as to present the starting or initiating surface 37 as soon as the stream y starts to flow. At this instant, the electric motor 42 is started up and rotates the rod 34, the cup 36, the rods 38, the ring 33 and the collar 39. Owing to the screwthreads of the rod 34 and the bore 30, this assembly moves downwardly while the sheet of particles 51 sweeps first the starting surface 37 which is thereafter replaced by the filling surface 52 constituted by the circular edge portion of the article 53 in course of formation.

In the presently-described embodiment, the sheet does not effect a pivotal motion but sweeps the filling surface 52 owing to the rotation of the object being produced.

The unit or assembly can rotate at 60–80 rpm for a tube having a diameter of 40 cm, the speed of the descent of the cup 36 being a function of the pitch of the screwthreads of the rod 34 and the bore 30.

Having now described my invention what I claim as new and desire to secure by letters Patent is:

1. A method for producing objects of ceramic comprising the steps of producing a continuous stream of molten ceramic product whose melting temperature is at least 5%–10% higher than the temperature of melting of the ceramic product; causing said stream to fall vertically onto a spray-forming surface from a height of between 50 and 200 cm, producing in the region of the point of impact of said stream on said spray-forming surface a gaseous cushion so as to reduce the coefficient of friction of said surface whereby a sheet of particles is created; orienting said spray-forming surface with respect to said stream in such manner as to direct said sheet onto a receiving surface which is fixed in space and which is constituted first by a starting surface which is moved in translation and thereafter by an edge portion of said object being produced; and moving said object in translation as it is produced.

2. A method as claimed in claim 1, wherein said gaseous cushion is produced by wetting said spray-forming surface.

3. A method as claimed in claim 1, wherein said gaseous cushion is formed by the sublimation of a solid material which constitutes said spray-forming surface, the sublimation being realized merely by the temperature of said stream when impinging on said surface.

4. A method as claimed in claim 3, wherein said material is polytetrafluoroethylene.

5. A method as claimed in claim 1, wherein said gaseous cushion is produced by lubricating said spray-forming surface with a lubricating liquid and said method further comprising the step of driving said spray-forming surface about an axis inclined with respect to said stream.

6. A method as claimed in claim 1, wherein said stream is caused to fall on said spray-forming surface at an angle of 120°–130°.

7. A method as claimed in claim 1, comprising subjecting said spray-forming surface to an oscillatory movement relative to said stream so that said sheet is made to sweep across said receiving surface.

8. A method for producing objects of ceramic comprising the steps of producing a continuous stream of molten ceramic product whose melting temperature is at least 5–10 percent higher than the temperature of melting of the ceramic product; causing said stream to fall vertically onto a spray-forming surface from a height of between 50 and 200 cm, producing in the region of the point of impact of said stream on said spray-forming surface a gaseous cushion so as to reduce the coefficient of friction of said surface whereby a sheet of particles is created; orienting said spray-forming surface with respect to said stream in such manner as to direct said sheet onto a receiving surface which is moved with respect to said sheet and which is constituted first by a starting surface which is moved in translation and thereafter by an edge portion of said object being produced; and moving said object in translation as it is produced.

9. A method as claimed in claim 8, wherein said receiving surface is annular and frusto-conical.

* * * * *